(12) United States Patent
McCorkendale et al.

(10) Patent No.: US 9,230,099 B1
(45) Date of Patent: *Jan. 5, 2016

(54) SYSTEMS AND METHODS FOR COMBINING STATIC AND DYNAMIC CODE ANALYSIS

(71) Applicant: Symantec Corporation, Mountain View, CA (US)

(72) Inventors: Bruce McCorkendale, Manhattan Beach, CA (US); Sheng Gong, Beijing (CN); Wei Guo Eric Hu, Beijing (CN); Ge Hua Huang, Beijing (CN); Jun Mao, Beijing (CN); Qingchun Meng, Beijing (CN); Xue Feng Tian, Beijing (CN); Xiaole Zhu, Beijing (CN)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,663

(22) Filed: Mar. 31, 2014

Related U.S. Application Data

(63) Continuation of application No. 13/434,416, filed on Mar. 29, 2012, now Pat. No. 8,726,392.

(51) Int. Cl.
| | |
|---|---|
| *G06F 12/14* | (2006.01) |
| *G06F 21/52* | (2013.01) |
| *G06F 21/60* | (2013.01) |
| *G06F 11/00* | (2006.01) |
| *G06F 12/16* | (2006.01) |
| *G08B 23/00* | (2006.01) |
| *G06F 11/30* | (2006.01) |

(52) U.S. Cl.
CPC .............. *G06F 21/52* (2013.01); *G06F 21/60* (2013.01)

(58) Field of Classification Search
None
See application file for complete search history.

(56) References Cited

U.S. PATENT DOCUMENTS

| | | | | |
|---|---|---|---|---|
| 5,826,013 | A * | 10/1998 | Nachenberg | 726/22 |
| 7,779,472 | B1 * | 8/2010 | Lou | 726/24 |
| 8,001,603 | B1 * | 8/2011 | Kennedy | 726/24 |
| 2004/0181677 | A1 * | 9/2004 | Hong et al. | 713/188 |
| 2006/0168213 | A1 * | 7/2006 | Richardson et al. | 709/225 |
| 2006/0230439 | A1 | 10/2006 | Smith et al. | |
| 2006/0282897 | A1 * | 12/2006 | Sima et al. | 726/25 |

(Continued)

OTHER PUBLICATIONS

"DexGuard", http://www.saikoa.com/dexguard, as accessed Mar. 25, 2014, (May 31, 2012).

(Continued)

*Primary Examiner* — Shin-Hon Chen
(74) *Attorney, Agent, or Firm* — ALG Intellectual Property, LLC

(57) ABSTRACT

A computer-implemented method for combining static and dynamic code analysis may include 1) identifying executable code that is to be analyzed to determine whether the executable code is capable of leaking sensitive data, 2) performing a static analysis of the executable code to identify one or more objects which the executable code may use to transfer sensitive data, the static analysis being performed by analyzing the executable code without executing the executable code, 3) using a result of the static analysis to tune a dynamic analysis to track the one or more objects identified during the static analysis, and 4) performing the dynamic analysis by, while the executable code is being executed, tracking the one or more objects identified during the static analysis to determine whether the executable code leaks sensitive data via the one or more objects. Various other methods, systems, and computer-readable media are also disclosed.

20 Claims, 5 Drawing Sheets

(56) References Cited

U.S. PATENT DOCUMENTS

| | | | |
|---|---|---|---|
| 2007/0240215 A1* | 10/2007 | Flores et al. | 726/24 |
| 2008/0028464 A1* | 1/2008 | Bringle et al. | 726/22 |
| 2008/0178287 A1* | 7/2008 | Akulavenkatavara et al. | 726/22 |
| 2009/0049550 A1* | 2/2009 | Shevchenko | 726/23 |
| 2009/0249492 A1 | 10/2009 | Boesgaard Sorensen | |
| 2011/0231936 A1* | 9/2011 | Williams et al. | 726/25 |
| 2012/0017274 A1* | 1/2012 | Schrecker | 726/22 |
| 2012/0266244 A1* | 10/2012 | Green et al. | 726/24 |
| 2014/0205099 A1 | 7/2014 | Christodorescu et al. | |

OTHER PUBLICATIONS

Constantin, Lucian "New Android Trojan app exploits previously unknown flaws, researchers say", http://www.computerworld.com/s/article/9239913/New_Android_Trojan_app_exploits_previously_unknown_flaws_researchers say?taxonomyId=17, as accessed Mar. 25, 2014, Computerworld Inc., (Jun. 7, 2013).

Xiaole Zhu, et al; Systems and Methods for Determining Whether Transmission of Sensitive Data is Expected; U.S. Appl. No. 14/283,824, filed May 21, 2014.

\* cited by examiner

SYSTEMS AND METHODS FOR COMBINING STATIC AND DYNAMIC CODE ANALYSIS

BACKGROUND

Traditional code analysis tools may implement either static or dynamic analysis to evaluate code for compliance with data loss prevention policies. Each type of analysis has various advantages and disadvantages. For example, dynamic code analysis may be able to detect leakage of sensitive data through network traffic and application programming interface call traces, but dynamic analysis may be resource intensive and cannot always determine the original source of the sensitive data. Static analysis may be more efficient than dynamic analysis and may be able to identify execution paths that can directly result in information leakage, but static analysis may not be able to determine the fate of sensitive data that is written to local files, placed on the clipboard, or is otherwise made available via inter-process communication mechanisms.

Both static and dynamic analysis may be ineffective in detecting data leaking in certain situations. For example, both static and dynamic analysis may fail to detect data leakage that occurs as a result of complex interactions between multiple applications or within a single application. What is needed, therefore, is a more efficient and effective mechanism for analyzing code to determine whether the code is capable of leaking sensitive data.

SUMMARY

As will be described in greater detail below, the instant disclosure generally relates to systems and methods for combining static and dynamic code analysis. In one example, a computer-implemented method for combining static and dynamic code analysis may include 1) identifying executable code that is to be analyzed to determine whether the executable code is capable of leaking sensitive data, 2) performing a static analysis of the executable code to identify one or more objects which the executable code may use to transfer sensitive data, the static analysis being performed by analyzing the executable code without executing the executable code, 3) using a result of the static analysis to tune a dynamic analysis to track the one or more objects identified during the static analysis, and 4) performing the dynamic analysis by, while the executable code is being executed, tracking the one or more objects identified during the static analysis to determine whether the executable code leaks sensitive data via the one or more objects.

According to various embodiments, the executable code comprises a single software application and the one or more objects which the executable code may use to transfer data comprise one or more storage locations that the single software application may write to and read from. Alternatively, the executable code may include a plurality of software applications and the one or more objects into which the executable code may transfer data comprise one or more inter-process communication channels used to communicate between applications in the plurality of software applications.

In certain embodiments, using the result of the static analysis to tune the dynamic analysis may include instrumenting the executable code to track access to the one or more objects identified during the static analysis. In such embodiments, using the result of the static analysis to tune the dynamic analysis to track the one or more objects identified during the static analysis may include identifying one or more application programming interfaces capable of accessing sensitive data and identifying one or more code paths capable of leaking sensitive data. Also, instrumenting the executable code may include hooking the one or more application programming interfaces capable of accessing sensitive data, and performing the dynamic analysis may include activating analysis within one or more application programming interface hooks to analyze the one or more code paths capable of leaking sensitive data.

According to at least one embodiment, the executable code may include JAVA bytecode and/or DALVIK bytecode. In various embodiments, identifying the executable code may include identifying a first software program that is capable of accessing sensitive data and identifying a second software program that is capable of transferring sensitive data outside the computing system, where the executable code comprise the first and second software programs.

In one embodiment, a system for implementing the above-described method may include 1) an identification module programmed to identify executable code that is to be analyzed to determine whether the executable code is capable of leaking sensitive data, 2) a static analyzer programmed to perform a static analysis of the executable code to identify one or more objects which the executable code may use to transfer sensitive data, the static analysis being performed by analyzing the executable code without executing the executable code, 3) a tuning module programmed to use a result of the static analysis to tune a dynamic analysis to track the one or more objects identified during the static analysis, 4) a dynamic analyzer programmed to perform the dynamic analysis by, while the executable code is being executed, tracking the one or more objects identified during the static analysis to determine whether the executable code leaks sensitive data via the one or more objects, and 5) at least one computer processor configured to execute the identification module, the static analyzer, the tuning module, and the dynamic analyzer.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify executable code that is to be analyzed to determine whether the executable code is capable of leaking sensitive data, 2) perform a static analysis of the executable code to identify one or more objects which the executable code may use to transfer sensitive data, the static analysis being performed by analyzing the executable code without executing the executable code, 3) use a result of the static analysis to tune a dynamic analysis to track the one or more objects identified during the static analysis, and 4) perform the dynamic analysis by, while the executable code is being executed, tracking the one or more objects identified during the static analysis to determine whether the executable code leaks sensitive data via the one or more objects.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
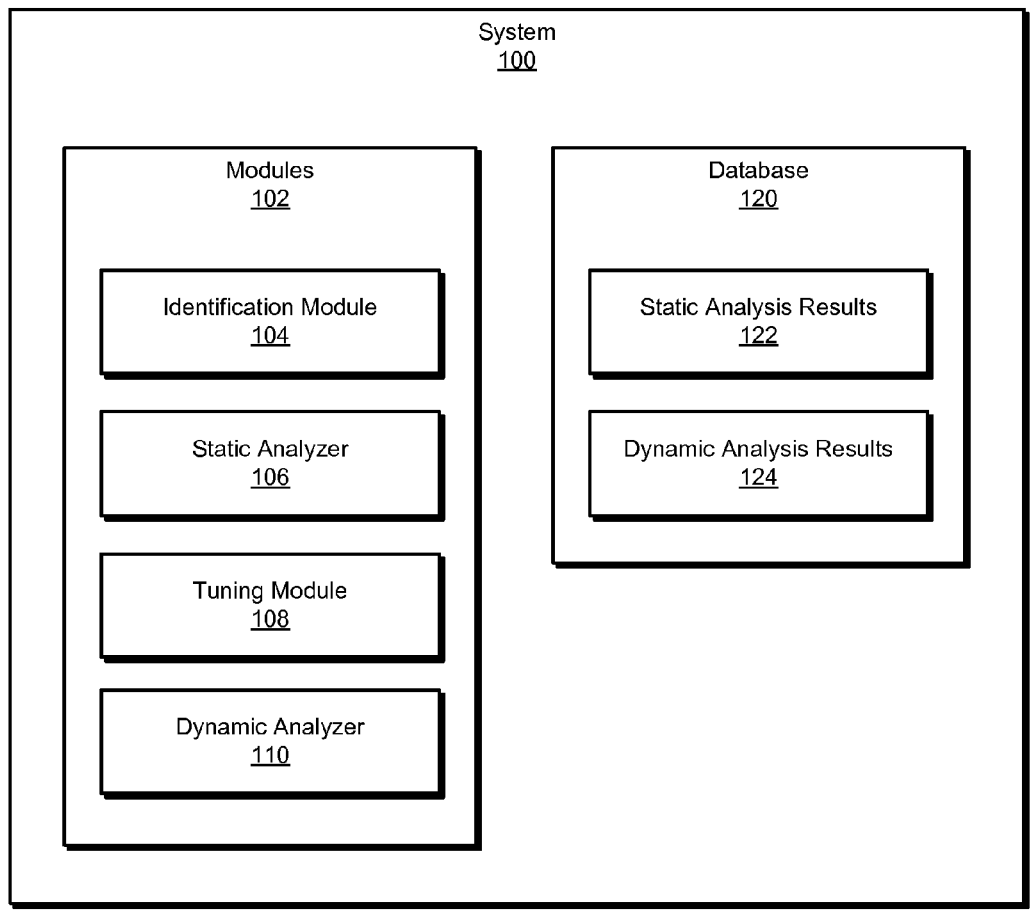
FIG. 1 is a block diagram of an exemplary system for combining static and dynamic code analysis.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure may combine static and dynamic analysis to analyze executable code to determine whether the executable code is capable of leaking sensitive data. For example, the systems and methods described herein may use static analysis to identify objects into which sensitive information can flow and may then tune a dynamic analysis to monitor the flow of sensitive data into and out of the identified objects. In this manner, the sensitive data may be tracked across storage and retrieval cycles of one application and/or multiple applications. The analysis systems and methods disclosed herein may be particularly useful on code within mobile devices (e.g., DALVIC virtual machines on ANDROID devices). Embodiments of the instant disclosure may also analyze code on various other types of systems and may provide various other features and advantages.

Figure 2:
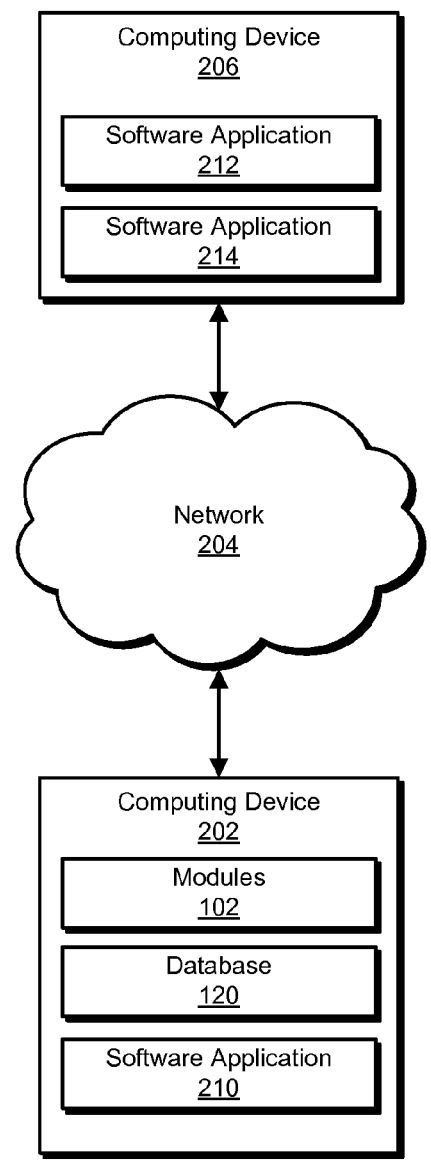
FIG. 2 is a block diagram of an exemplary system for combining static and dynamic code analysis.

The following will provide, with reference to FIGS. 1-2, detailed descriptions of exemplary systems for combining static and dynamic code analysis. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for combining static and dynamic code analysis. As illustrated in this figure, exemplary system 100 may include one or more modules 102 for performing one or more tasks. For example, and as will be explained in greater detail below, exemplary system 100 may include an identification module 104 programmed to identify executable code that is to be analyzed to determine whether the executable code is capable of leaking sensitive data. System 100 may also include a static analyzer 106 programmed to perform a static analysis of the executable code to identify one or more objects which the executable code may use to transfer sensitive data, the static analysis being performed by analyzing the executable code without executing the executable code.

In addition, and as will be described in greater detail below, exemplary system 100 may include a tuning module 108 programmed to use a result of the static analysis to tune a dynamic analysis to track the one or more objects identified during the static analysis. System 100 may also include a dynamic analyzer 110 programmed to perform the dynamic analysis by, while the executable code is being executed, tracking the one or more objects identified during the static analysis to determine whether the executable code leaks sensitive data via the one or more objects. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing device 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store static analysis results 122 and/or dynamic analysis results 124. Database 120 may represent portions of a single database or computing device or a plurality of databases or computing devices. For example, database 120 may represent a portion of computing device 202 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 via a network 204. Computing device 202 may include modules 102 and database 120 for performing local analysis on software application 210. Modules 102 may additionally or alternatively perform local analysis on multiple applications installed to computing device 202 or may perform remote analysis on one or more applications installed to one or more remote computing devices, such as software applications 212 and 214 on computing device 206.

In one embodiment, one or more of modules 102 from FIG. 1 may, when executed by at least one processor of computing device 202, enable computing device 202 to combining static and dynamic code analysis to analyze code to determine whether the code is capable of leaking sensitive data. For example, and as will be described in greater detail below, one or more of modules 102 may cause computing device 202 to 1) identify executable code that is to be analyzed to determine whether the executable code is capable of leaking sensitive data, 2) perform a static analysis of the executable code to identify one or more objects which the executable code may use to transfer sensitive data, the static analysis being performed by analyzing the executable code without executing the executable code, 3) use a result of the static analysis to tune a dynamic analysis to track the one or more objects identified during the static analysis, and 4) perform the dynamic analysis by, while the executable code is being executed, tracking the one or more objects identified during the static analysis to determine whether the executable code leaks sensitive data via the one or more objects.

Computing devices 202 and 206 generally represents any type or form of computing device capable of reading computer-executable instructions. Examples of computing devices 202 and 206 include, without limitation, laptops, tablets, desktops, servers, cellular phones, personal digital assistants (PDAs), multimedia players, embedded systems, combinations of one or more of the same, exemplary computing system 410 in FIG. 4, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between computing device 202 and computing device 206.

Figure 3:
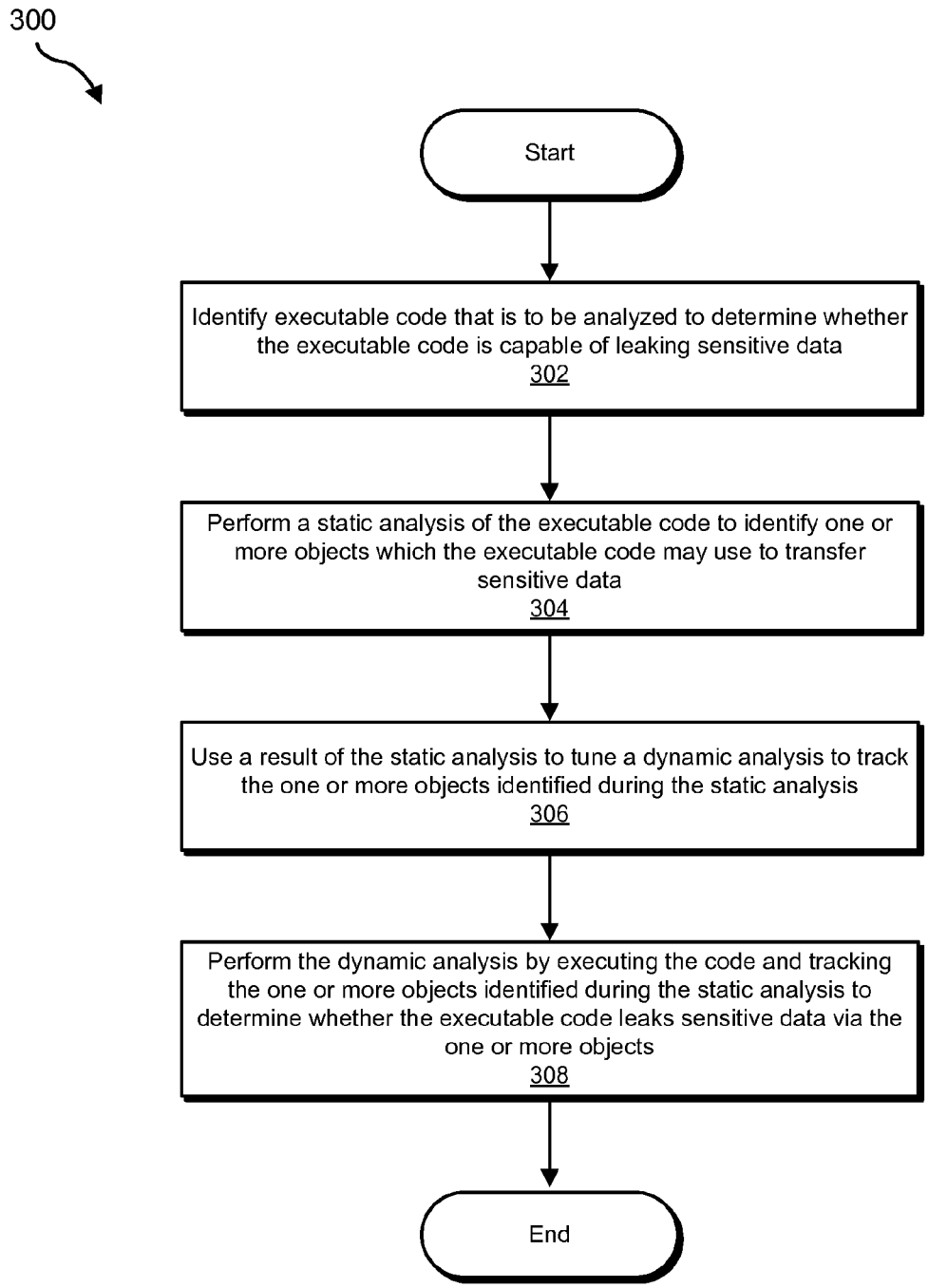
FIG. 3 is a flow diagram of an exemplary method for combining static and dynamic code analysis.

FIG. 3 is a flow diagram of an exemplary computer-implemented method 300 for combining static and dynamic code analysis. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

At step 302 in FIG. 3, one or more of the systems described herein may identify executable code that is to be analyzed to determine whether the executable code is capable of leaking sensitive data. For example, identification module 104 in FIG. 1 (which may, as detailed above, represent a portion of computing device 202 in FIG. 2) may identify executable code that is to be analyzed to determine whether the executable code is capable of leaking sensitive data. Identification module 104 may identify executable code to be analyzed in any suitable manner. For example, identification module 104 may identify executable code to be analyzed during development of the executable code. Additionally or alternatively, identification module 104 may identify the executable code as part of a process for evaluating the executable code within a particular computing environment and/or to evaluate the code for compliance with one or more data-loss-prevention policies while the code is running.

As used herein, the phrase "data loss prevention" may refer to a technique for protecting sensitive information by applying one or more policies, rules, and/or heuristics to data within the bounds of a data loss prevention system to determine the disposition of the data in various scenarios. In some examples, a data loss prevention system may be configured to prevent sensitive information from leaking (e.g., being transmitted outside the bounds of the system under uncontrolled circumstances). Additionally or alternatively, a data loss prevention system may be configured to prevent sensitive information from being misused and/or insecurely stored. Embodiments of the instant disclosure may be implemented as part of a data loss prevention system.

In some embodiments, identification module 104 may identify the executable code by identifying one or more software applications to be analyzed. For example, identification module 104 may identify software application 210 on computing device 202, software application 212 on computing device 206, and/or software application 214 on computing device 206. Identification module 104 may identify a single software application for analysis in some embodiments, and in other embodiments identification module 104 may identify multiple software applications for analysis. For example, identification module 104 may identify a first software program that is capable of accessing sensitive data and a second software program that is capable of transferring sensitive data outside a computing device. In this manner, identification module 104 may identify software applications to analyze interactions between the software applications.

As used herein, the phrase "executable code" generally refers to any type or form of instructions capable of being executed by a computing device. In some embodiments, executable code may include JAVA bytecode and/or DALVIC bytecode. Executable code may also include code programmed in any other language and/or formatted in any other format.

As used herein, the phrase "sensitive data" may refer to any data that a user and/or company would not want sent outside of a computing device or system without knowledge and/or permission of the user and/or company. Examples of sensitive information may include, without limitation, a name, a phone number, a device identifier, an email address, a contact, a browser history, a browser cookie, a phone history, a message history, location information (e.g., global positioning system information), financial information (e.g., credit card numbers, bank account numbers, etc.), confidential information, privileged information, personal information (e.g., a social security number, a driver's license number, etc.), sensitive corporate information (e.g., intellectual property, customer lists, product roadmaps, etc.), usage information, and/or any other type of sensitive data.

As used herein, the phrase "outside a computing device" may refer to any location external to and/or apart from a computing device. For example, if data is exposed outside a computing device, the data may be transferred to a removable hard drive attached to the computing device, the data may be transferred over a network to which the computing device is connected, the data may be displayed or otherwise provided on an input/output device connected to the computing device, and/or the data may be exposed in any other manner.

At step 304 in FIG. 3, one or more of the systems described herein may perform a static analysis of the executable code to identify one or more objects which the executable code may use to transfer sensitive data. For example, static analyzer 106 in FIG. 1 (which may, as detailed above, represent a portion of computing device 202 in FIG. 2) may perform a static analysis of the software application 210 to identify one or more objects which software application may use to transfer sensitive data.

As used herein, the phrase "static analysis" generally refers to any analysis of code that is performed without actually executing any instructions of the code. In other words, static analysis may analyze the text of executable code to derive properties of the code's execution while the code is static (i.e., not running). In some embodiments, static analysis may involve data-flow analysis to gather information about the executable code. In a data-flow analysis, static analyzer 106 may use a program's control flow graph to determine parts of a program to which a particular value assigned to a variable might propagate. Static analyzer 106 may also implement data-flow analysis using any suitable algorithm and/or heuristic.

As noted, static analyzer 106 may perform a static analysis of the executable code to identify objects which the executable code may use to transfer sensitive data. The executable code may use one or more of various types of objects to transfer sensitive data. For example, executable code may use inter-process communication channels (e.g., named pipes, message passing such as broadcasted intents, synchronization, shared memory, copy and paste functions, clipboards, remote procedure calls, etc.) to transfer sensitive data. Other examples of objects used to transfer sensitive data include APIs (e.g., data access APIs programmed to provide access to sensitive information, data transfer APIs programmed to send information outside a computing device, etc.), and/or storage locations (e.g., files, databases, DALVIC bytecode content providers, etc.).

In some embodiments, static analyzer 106 may perform a static analysis on a single software application. In such embodiments, static analyzer 106 may identify objects to which the executable code (i.e., the single software application) may write, read, and/or transfer sensitive data. For example, if a software application is capable of writing sensitive data to a file and is also capable of exporting the file, static analyzer 106 may identify the file as an object capable of leaking sensitive data.

As noted above, static analyzer 106 may also analyze a plurality of software applications. In such embodiments, static analyzer 106 may identify one or more storage locations that each software application in the plurality may access and/or may identify inter-process communication mechanisms that may transfer sensitive data between two or more software applications. For example, static analyzer 106 may determine that two programs share memory to which sensitive data may be stored.

At step 306 in FIG. 3, one or more of the systems described herein may use a result of the static analysis to tune a dynamic analysis to track the one or more objects identified during the static analysis. For example, tuning module 108 (which may, as detailed above, represent a portion of computing device 202 in FIG. 2) may use a result of the static analysis to tune a dynamic analysis to track one or more objects identified during the static analysis.

Tuning module 108 may use the result of the static analysis to tune a dynamic analysis in any suitable manner. For example, tuning module 108 may use the objects identified during static analysis to tune a dynamic analysis to track, monitor, and/or otherwise analyze the objects identified during the static analysis.

In some embodiments, tuning module 108 may use the result of the static analysis to tune the dynamic analysis by instrumenting the executable code to track access to the one or more objects identified during the static analysis. Tuning module 108 may instrument the executable code by inserting analysis code into the executable code inline, by using one or more external routines, and/or in any other suitable manner. For example, tuning module 108 may use static binary instrumentation to instrument the executable code before the code is run. Tuning module 108 may also use dynamic binary instrumentation to inject analysis code into the executable code while the executable code is running.

In one example of instrumenting the executable code, tuning module 108 may identify one or more APIs capable of accessing sensitive data (e.g., reading, writing, and/or transferring sensitive data). Tuning module 108 may also identify one or more code paths capable of leaking sensitive data. In such embodiments, tuning module 108 may instrument the executable code by hooking the one or more APIs capable of accessing sensitive data such that, when the dynamic analysis is performed, the dynamic analysis may activate analysis within one or more API hooks to analyze the one or more code paths capable of leaking sensitive data.

Tuning module 108 may additionally or alternatively instrument the executable code to watch data written to and read from a storage location identified during the static analysis, to track sensitive data passed between programs using other inter-process communication channels, and/or in any other manner.

At step 308 in FIG. 3, one or more of the systems described herein may perform the dynamic analysis by, while the executable code is being executed, tracking the one or more objects identified during the static analysis to determine whether the executable code leaks sensitive data via the one or more objects. For example, dynamic analyzer 110 in FIG. 1 (which may, as detailed above, represent a portion of computing device 202 in FIG. 2) may perform the dynamic analysis by, while software application 210 is being executed, tracking the one or more objects identified during the static analysis to determine whether software application 210 leaks sensitive data via the one or more objects.

Dynamic analyzer 110 may perform the dynamic analysis in any suitable manner. For example, dynamic analyzer 110 may monitor code paths identified by static analyzer 106, may monitor APIs identified by static analyzer 106, may monitor files identified by static analyzer 106, may identify and analyze inter-process communication channels identified by static analyzer 106, and/or may perform any other suitable analysis of the executable code based on information obtained by static analyzer 106.

Dynamic analyzer 110 may perform the dynamic analysis in a variety of contexts. For example, dynamic analyzer 110 may be used to identify individual applications that may compromise sensitive data. As another example, dynamic analyzer 110 may analyze a set of applications to determine whether any installed combination of applications results in a risk of sensitive data being leaked. If a single application or combination of applications results in risk of sensitive data being leaked, the systems described herein may warn consumers that installing the application(s) may present a privacy risk.

In some embodiments, dynamic analyzer 110 may perform the dynamic analysis while a computing system is in use to detect attempts by the executable code to leak sensitive data. If dynamic analyzer 110 detects an attempt to leak sensitive data, a data loss prevention system may perform a security action with respect to the sensitive data.

A data loss prevention system may perform a security action in a variety of ways. For example, the data loss prevention system may perform the security action by logging the attempt to leak sensitive data outside of a computing device. In the log, the data loss prevention system may identify the application that attempted to leak sensitive data, how the application accessed or used sensitive data, and/or the destination to which the application attempted to leak sensitive data. The data loss prevention system may also store the log to a log file, a database, and/or to a memory location on a computing device. The data loss prevention system may further send the log to a remote tracking server, to an administrator, and/or to any other destination.

In one embodiment, the data loss prevention system may perform the security action by notifying a user of a computing device of the attempt to leak sensitive data outside of the computing device. For example, the data loss prevention system may present a notification, to the user of the computing device, indicating that the attempt to leak sensitive data was detected. The data loss prevention system may also enable the user of the computing device to prevent the leak of sensitive data (e.g., by querying the user about whether to allow the information to be transmitted outside of a computing device).

In another embodiment, the data loss prevention system may perform the security action by notifying a third party of the attempt to leak sensitive data outside of a computing device. For example, the data loss prevention system may notify an operating system provider, a security vendor, an application store provider, and/or a cellular provider about the attempt to leak sensitive data.

In some embodiments, the data loss prevention system may perform the security action by preventing the attempt to leak sensitive data outside of a computing device. For example, the data loss prevention system may prevent the attempt, by the executable code, to leak sensitive data by quarantining the executable code, by removing the executable code from a computing device, by preventing the executable code from sending any information outside of a computing device, and/or by preventing the executable code from sending any information outside of a computing device that comprises sensitive data.

Figure 4:
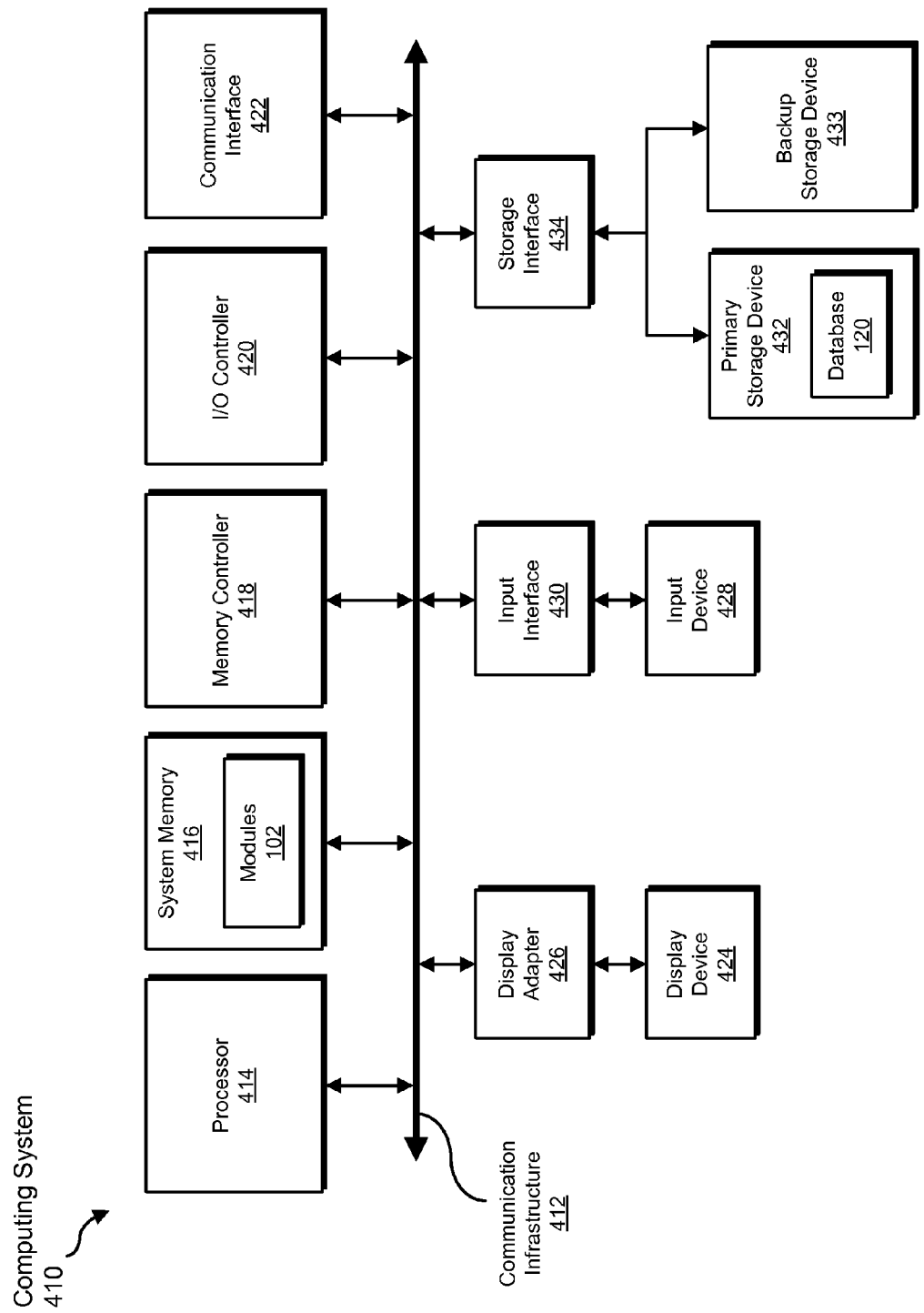
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the instrumenting, performing, using, and identifying steps described herein. All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 410. All or a portion of the computer program stored on the computer-readable-storage medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
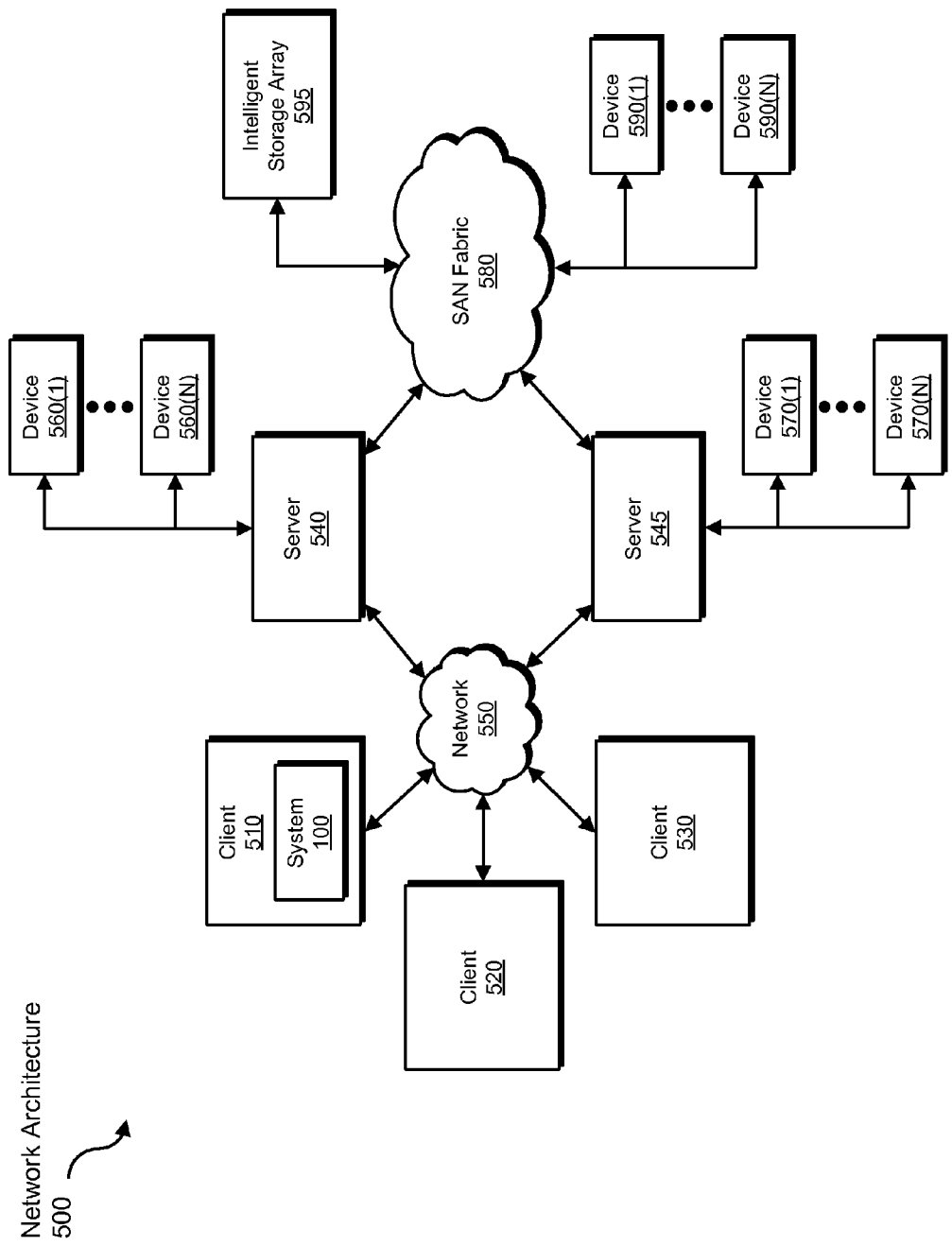
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the instrumenting, performing, using, and identifying steps disclosed herein. All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for combining static and dynamic code analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device by tuning a dynamic analysis based on a static analysis.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for combining static and dynamic code analysis, at least a portion of the method being performed by a computing system comprising at least one computer processor, the method comprising:
    identifying, as part of a process for evaluating executable code for compliance with at least one data loss prevention policy, executable code that is to be analyzed to determine whether the executable code is capable of leaking sensitive data;
    performing a static analysis of the executable code to identify one or more objects comprising at least one inter-process communication channel which the executable code may use to transfer sensitive data between two or more software applications that use the at least one inter-process communication channel;
    using a result of the static analysis to tune a dynamic analysis by instrumenting the executable code to track access to the one or more objects identified during the static analysis;
    performing the dynamic analysis by, while the executable code is being executed, tracking the one or more objects identified during the static analysis to determine whether the executable code leaks sensitive data via the one or more objects identified during the static analysis.

2. The computer-implemented method of claim 1, wherein:
    the one or more objects identified during the static analysis comprise at least one storage location;
    instrumenting the executable code comprises monitoring data written to and read from the at least one storage location.

3. The computer-implemented method of claim 2, wherein the at least one storage location comprises at least one of:
    a file;
    a database;
    a DALVIC bytecode content provider.

4. The computer-implemented method of claim 1, wherein:
    the executable code comprises:
        a first software application that can access sensitive data; and a second software application that can transmit sensitive data outside a computing system that hosts the first software application and the second software application;
identifying the executable code comprises identifying the inter-process communications channel that the first software application may use to transfer sensitive data to the second software application;
instrumenting the executable code comprises tracking sensitive data transferred between the first software application and the second software application using the inter-process communications channel.

5. The computer-implemented method of claim 1, wherein the at least one inter-process communication channel comprises at least one of:
   a named pipe;
   a message passing;
   synchronization;
   shared memory;
   a copy and paste function;
   a clipboard;
   a remote procedure call.

6. The computer-implemented method of claim 1, wherein identifying the executable code comprises at least one of:
   identifying the executable code during development of the executable code;
   identifying the executable code as part of a process for evaluating the executable code within a particular computing environment;
   identifying the executable code while the executable code is running.

7. The computer-implemented method of claim 1, wherein the at least one data loss prevention policy is configured to prevent sensitive information from leaking.

8. A system for combining static and dynamic code analysis, the system comprising:
   an identification module programmed to identify, as part of a process for evaluating executable code for compliance with at least one data-loss prevention policy, executable code that is to be analyzed to determine whether the executable code is capable of leaking sensitive data;
   a static analyzer programmed to perform a static analysis of the executable code to identify one or more objects comprising at least one inter-process communication channel which the executable code may use to transfer sensitive data between two or more software applications that use the at least one inter-process communication channel;
   a tuning module programmed to use a result of the static analysis to tune a dynamic analysis by instrumenting the executable code to track access to the one or more objects identified during the static analysis;
   a dynamic analyzer programmed to perform the dynamic analysis by, while the executable code is being executed, tracking the one or more objects identified during the static analysis;
   at least one computer processor configured to execute the identification module, the static analyzer, the tuning module, and the dynamic analyzer.

9. The system of claim 8, wherein:
the executable code comprises a single software application;
the one or more objects identified during the static analysis comprise objects to which the single software application may write to and read from.

10. The system of claim 8, wherein:
the one or more objects identified during the static analysis comprise at least one storage location;
the tuning module instruments the executable code by monitoring data written to and read from the storage locations.

11. The system of claim 8, wherein:
the executable code comprises a plurality of software applications;
the one or more objects identified during the static analysis comprise one or more storage locations that each software application within the plurality of software applications may access.

12. The system of claim 8, wherein:
the executable code comprises a plurality of software applications;
the one or more objects identified during the static analysis comprise one or more inter-process communication channels that may transfer sensitive information between two or more software applications within the plurality of software applications.

13. The system of claim 8, wherein:
the executable code comprises:
   a first software application that can access sensitive data; and
   a second software application that can transmit sensitive data outside a computing system that hosts the first software application and the second software application;
the identification module identifies the executable code at least in part by identifying the inter-process communications channel that the first software application may use to transfer sensitive data to the second software application;
the tuning module instruments the executable code at least in part by tracking sensitive data transferred between the first software application and the second software application using the inter-process communications channel.

14. The system of claim 8, wherein the tuning module instruments the executable code by at least one of:
   inserting analysis code into the executable code inline;
   using static binary instrumentation to instrument the executable code before the executable code is run;
   using dynamic binary instrumentation to inject analysis code into the executable code while the executable code is running.

15. A non-transitory computer-readable medium comprising one or more computer-executable instructions that, when executed by at least one processor of a computing device, cause the computing device to:
   identify, as part of a process for evaluating executable code for compliance with at least one data-loss prevention policy, executable code that is to be analyzed to determine whether the executable code is capable of leaking sensitive data;
   perform a static analysis of the executable code to identify one or more objects comprising at least one inter-process communication channel which the executable code may use to transfer sensitive data between two or more software applications that use the at least one inter-process communication channel;
   use a result of the static analysis to tune a dynamic analysis by instrumenting the executable code to track access to the one or more objects identified during the static analysis;
   perform the dynamic analysis by, while the executable code is being executed, tracking the one or more objects identified during the static analysis to determine whether the executable code leaks sensitive data via the one or more objects identified during the static analysis.

16. The non-transitory computer-readable medium of claim 15, wherein:
   the one or more objects identified during the static analysis comprise at least one storage location;
   the one or more computer-executable instructions instrument the executable code by monitoring data written to and read from the at least one storage location.

17. The non-transitory computer-readable medium of claim 15, wherein the one or more computer-executable instructions further perform the static analysis by at least one of:
   performing a data-flow analysis to gather information relating to the executable code;
   using a control flow graph of the executable code to determine parts of the executable code to which a particular value assigned to a variable potentially propagates.

18. The non-transitory computer-readable medium of claim 15, wherein the one or more computer-executable instructions identify the executable code by:
   identifying a first software application that is capable of accessing sensitive data;
   identifying a second software application that is capable of transferring the sensitive data outside a computing system comprising the second software application, wherein the executable code comprises the first and second software application.

19. The non-transitory computer-readable medium of claim 18, further comprising:
   identifying the executable code at least in part by identifying the inter-process communications channel that the first software application may use to transfer sensitive data to the second software application;
   instrumenting the executable code at least in part by tracking sensitive data transferred between the first software application and the second software application using the inter-process communications channel.

20. The non-transitory computer-readable medium of claim 15, wherein the executable code comprises at least one of:
   JAVA bytecode;
   DALVIK bytecode.

* * * * *